United States Patent [19]

Thomas

[11] Patent Number: 4,699,177

[45] Date of Patent: Oct. 13, 1987

[54] POSITIONABLE FLANGED WALL PIPE FOR MASONRY WALL INSTALLATION

[76] Inventor: Charles T. Thomas, Rt. 2, P.O. Box 609, Early, Tex. 76801

[21] Appl. No.: 642,413

[22] Filed: Aug. 20, 1984

[51] Int. Cl.⁴ ............................................. F16L 5/02
[52] U.S. Cl. ................................. 138/103; 138/107; 138/109; 138/110; 285/189
[58] Field of Search ............... 138/103, 109, 110, 112, 138/173, 178, 182; 285/189, 158, 413; 4/172, 192; 52/220

[56]   References Cited
U.S. PATENT DOCUMENTS

| 3,126,035 | 3/1964 | Espetvedt | 138/162 |
|---|---|---|---|
| 3,489,182 | 1/1970 | Cameron | 138/103 |
| 3,550,638 | 12/1970 | Smith | 138/99 |
| 4,063,759 | 12/1977 | Steimle | 285/109 |
| 4,073,515 | 2/1978 | Perera | 285/158 |
| 4,079,970 | 3/1978 | Brett | 285/158 |
| 4,111,234 | 9/1978 | Wells et al. | 138/99 |
| 4,170,260 | 10/1979 | Rudd et al. | 285/413 X |
| 4,516,749 | 5/1985 | Sullivan | 285/158 X |
| 4,550,451 | 11/1985 | Hubbard | 285/158 X |
| 4,557,470 | 12/1985 | Link | 138/172 |

Primary Examiner—James E. Bryant, III
Attorney, Agent, or Firm—Michael A. O'Neil

[57] ABSTRACT

A flanged wall pipe or sleeve for masonry walls which utilizes a separate positionable flange member having a projecting radial flange adapted to permanent attachment to an intermediate area of the pipe. The flange member and barrel member of the pipe may have annular rib and groove portions for mating engagement. Alternately, the flange member may be attached by set screws or adhesive to prevent lateral movement of the joined members.

8 Claims, 11 Drawing Figures

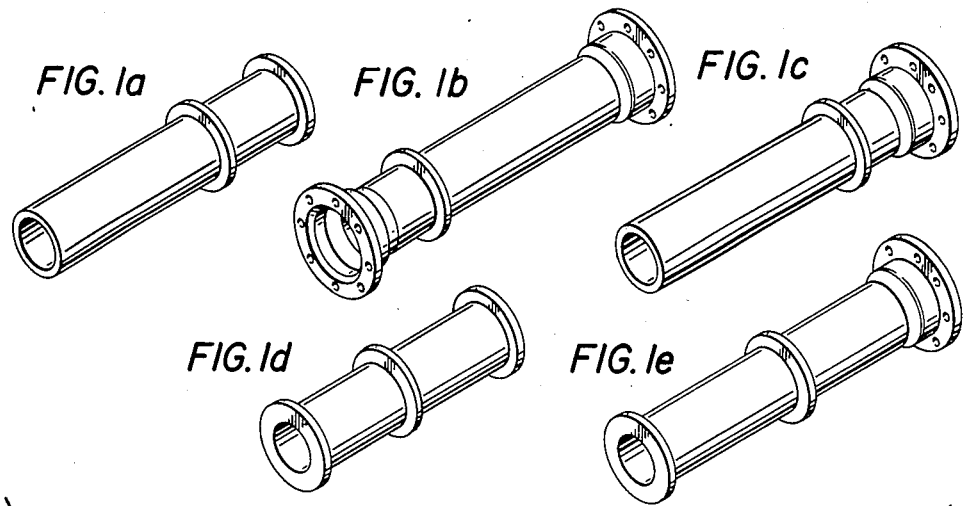
FIG. 1a FIG. 1b FIG. 1c
FIG. 1d FIG. 1e
PRIOR ART
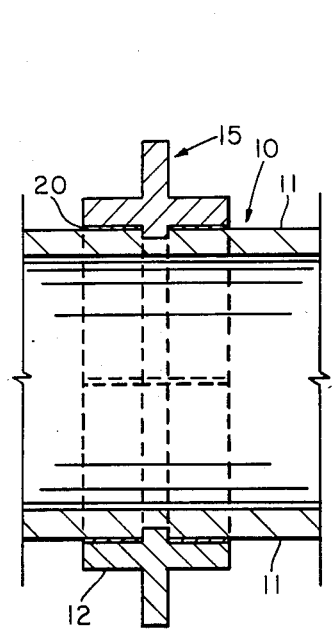
FIG. 2
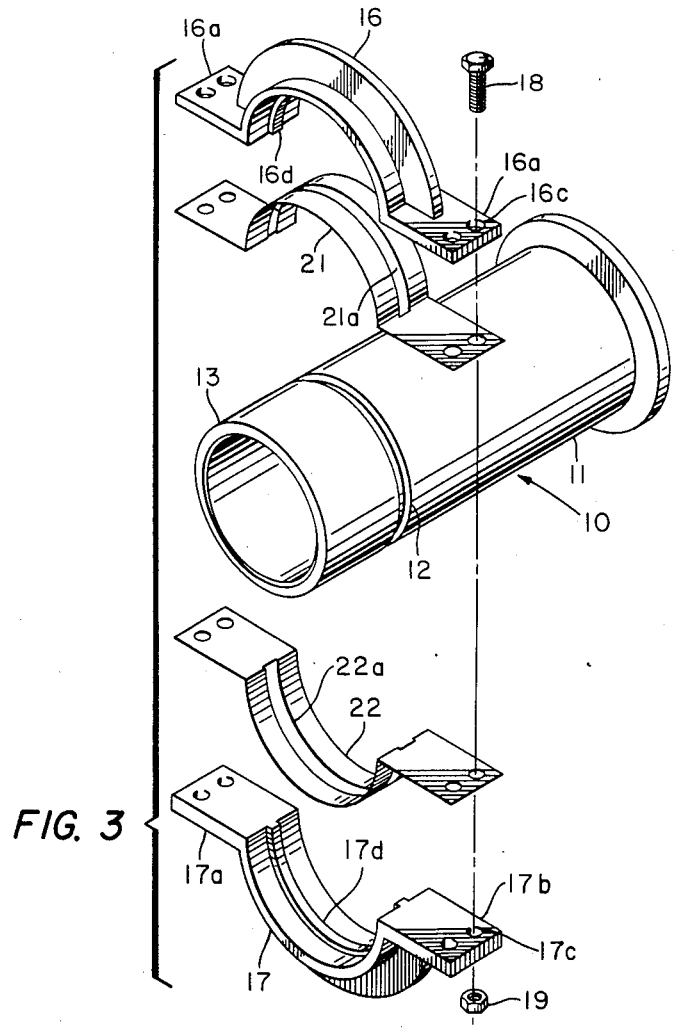
FIG. 3

POSITIONABLE FLANGED WALL PIPE FOR MASONRY WALL INSTALLATION

This invention relates to a flanged wall pipe and more particularly to a positionable flanged wall pipe in which the flange is separately formed and positively united with the wall pipe.

BACKGROUND OF THE INVENTION

The wall pipe is adapted to preplacement in the wall with the flange portion rigidly attached in preselected position. Prior to the wall being formed or cast to provide a mechanical joint with the wall pipe, the pipe having a projecting radial flange is aligned in place to provide the connection between a pair of pipes which extend to or into opposite sides of the wall.

Mechanical joint wall pipes or sleeves are normally cast to a wide range of specifications depending upon the wall thickness and the diameter of pipe to be connected or accommodated. In such practice it is required that a large inventory of such wall pipes or sleeves be maintained by the building contractor in view of the large numbers of combinations which are possible due to varying wall thicknesses and surface pipe diameters. Such wall joints must normally be flanged to provide structural integrity between the wall and the interconnecting pipe or sleeve once the wall is formed, to prevent seepage of water and gases along the interface between the pipe and the masonry wall.

It is necessary that a reliable fluid-tight seal be effected between the pipe and the masonry wall through which the pipe passes.

Previously the prior art has required that many different sizes and shapes of mechanical-joint wall pipes be made available having an intermediate flange for mounting interiorly of the wall. Various attempts to minimize such large inventories of wall sizes are found in the prior art such as U.S. Pat. No. 4,071,265 to Wallace which relates to a threaded mechanical joint wall sleeve comprising a cylindrical member having opposite ends with inside and outside flanged surfaces. A pair of threaded end members or adaptors is threadably secured to the exterior or interior surfaces of opposite ends of the cylindrical member and is adapted to attachment to opposite sides of the wall.

U.S. Pat. No. 4,063,759 to Steimle discloses a water barrier to prevent seepage past pipes installed through a masonry wall. Such a barrier comprises a tubular sleeve encircled by flanges having a fluid-tight fit with the pipe along a portion thereof embedded in and sealed to an impervious coating on the wall surface. Such water barrier sleeves are of particular utility for water circulating and drainage pipes installed within the walls and bottoms of masonry swimming pools, but are not particularly useful for other applications in building construction.

U.S. Pat. No. 2,564,372 to Phelps relates to flanged articles and especially to methods of attaching flanges to articles such as pipes, valves and wheel hubs. In such a method the tubular member is formed in cup-shape with a beveled edge which is flattened while positioned within a radial wall of a pre-formed groove in the central element.

Such adaptive wall sleeves are considerably more complex than the present invention and do not lend themselves to preplacement in the wall area prior to its formation or casting to form a durable mechanical connection.

Therefore, it is a principal object of this invention to provide a flanged wall pipe or sleeve for masonry walls which utilizes a positionable rigidly attached flange for permanent interconnection with the wall structure. The subject structure of wall pipe provides both a water and gas barrier to prevent transmittal of the fluids past pipes installed in a masonry wall. The subject pipe is useful for both above-ground and underground installations in a wide range of operating environments.

A further object of this invention is to provide a wall pipe or sleeve having a rigidly attachable separate flange member to be mounted in a preselected lateral area to permit substantial reduction in the inventory of such wall pipe over that normally required.

A still further object of the invention is to provide a flanged wall pipe or sleeve in which the separately-formed flange may be interconnected to the pipe by various means to provide rigid durable interconnection whether the pipe be formed of metal or plastic materials. The subject wall pipe may be fabricated in the field from regular lengths of pipe having the desired end configurations, the flanged portion being attached to the pipe in permanent precise location laterally by various forms of attachment for mounting of such portion interiorly of the wall.

Another object of the present invention is to provide a method of forming a flanged wall pipe for wall installation from a length of regular pipe having a generally uniform exterior diameter to permit substantial reduction in pipe inventory and in-the-field forming as desired or required.

The foregoing objects and certain additional advantages which may be attained in the flanged article illustrated in the accompanying drawings and embodying the invention is described hereinbelow.

BRIEF DESCRIPTION OF THE DRAWINGS

FIG. 1, which consists of FIGS. 1a through 1e, is a series of perspective views of various forms of prior art wall pipes, all having integral cast-in-place intermediate flanges on their exterior surfaces.

FIG. 2 is a vertical sectional view of the flanged wall pipe embodying the present invention.

FIG. 3 is an exploded perspective view of the flanged wall pipe of FIG. 2.

DESCRIPTION OF THE PREFERRED EMBODIMENT

Figure 4:
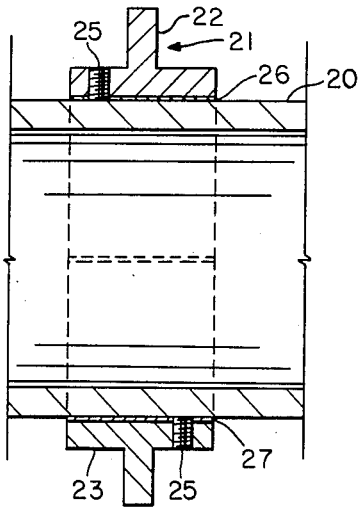
FIG. 4 is a vertical sectional view of a second embodiment of the flanged wall pipe.

Referring to FIG. 1 and more specifically, FIGS. 1a through 1e, there is shown a series of illustrative embodiments of various forms of wall pipes, each having various end configurations with an intermediate outwardly-projecting flange formed integral with the pipe. Normally in the case of cast iron pipe such wall pipes are formed having the desired end configuration with the radial flange integrally formed either centrally or adjacent an interconnecting endwise flange portion which normally projects beyond the wall. The integral projecting central flange is normally intended for use interiorly of the wall in which it is to be located, the wall being formed or cast therearound. As stated hereinabove, such wall pipes necessitate a very extensive inventory to satisfy all possible end use requirements.

As shown in FIGS. 2 and 3, the numeral 10 generally refers to the mechanical joint wall pipe of this invention. The barrel member 11 of the pipe is formed either with or without end flanges of generally standard configuration. As shown in both FIGS. 2 and 3, an annular groove 12 is formed in the exterior surface of barrel member 11, such circumambient groove being located transversely to the barrel axis. Barrel member 11 is generally uniformly cylindrical in shape having opposite ends 13 and 14 terminating either in a right-cylindrical square end or a flanged configuration respectively as desired or required.

A separate flange member 15 which is comprised of two semi-circular shell or segment members 16 and 17 is employed to surround the barrel member. Flange member 15, when its halves are joined, has an interior diameter closely complemental to the diameter of barrel member 11. Each of the semi-circular half segments 16 and 17 are formed with matching outwardly-extending lugs or retention flanges. Segment 16 has juxtaposed lugs designated as 16a and 16b which match the lugs on similar segment 17, such lugs being designated 17a and 17b. Suitable bolt hole apertures 16c are provided in the mounting lugs of both half segments in aligned relation to receive interconnecting bolts 18 and nut 19 disposed in the aligned bolt hole openings. The flange member flange segments 16 and 17 are each provided with semi-circular inwardly projecting rib members 16d and 17d respectively having a dimension closely complemental to the groove 12 in the pipe barrel. The annular interior rib formed by the two segments is adapted to firm interconnection when seated in the annular groove in mating engagement on joining the flange member 15 to the pipe barrel 11.

A resilient annular gasket member 20 is provided to fit within each of the half segments 16 and 17 intermediate the pipe barrel and flange member. The semicircular half segments of the gasket 20 are designated by the numerals 21 and 22 in FIG. 3. Each of the segments has a semi-circular opening in a central region to permit direct interconnection of the inwardly-projecting rib portions 16d and 17d of the flange member with the groove 12 of the pipe barrel. Thus, the interconnecting groove and rib of the pipe barrel and flange member prevent lateral movement of the flange member with respect to the pipe barrel while the gasket member serves to provide a fully waterproof connection between such members to prevent water seepage along the pipe following its installation. The gasket may be formed of elastomeric resilient gasketing material such as silicone rubber or other thermoplastic material.

In addition, the pipe barrel may have two or more similar annular grooves in its exterior surface to permit plural options as to the lateral positioning of the flange member on the barrel depending upon wall thickness and pipe connection variables.

Figure 5:
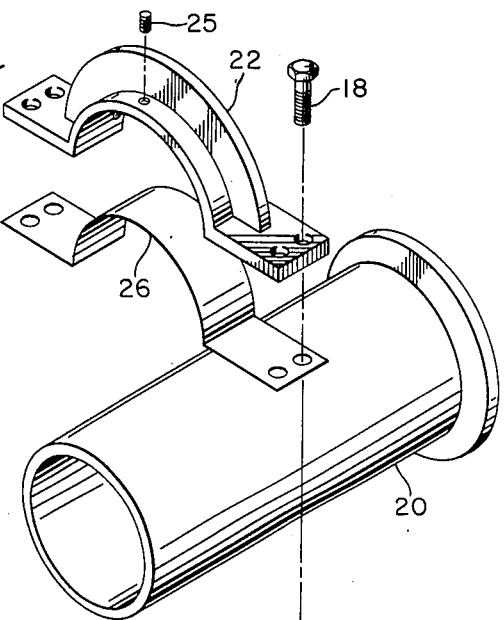
FIG. 5 is an exploded perspective view of the flanged wall pipe of FIG. 4.

Another embodiment of the present invention is shown in FIGS. 4 and 5 wherein the pipe barrel 20 is provided with a smooth cylindrical surface without the groove as aforesaid. In this structure the flange member 21 which is comprised of the two semi-circular half segments 22 and 23 has a smooth interior surface devoid of the inwardly-projecting rib of the first embodiment. A series of threaded set screws designated by the numeral 25 are mounted in threaded openings in each of the half segments 22 and 23. The semi-circular half sections of the gasket member designated by the numerals 26 and 27 have smooth interior surfaces closely complemental to the exterior cylindrical configuration of barrel member 11. When the half sections of the flange member 21 are joined by the matching projecting lugs and connecting bolts as stated supra with the resilient gasket member interposed between the flange member and the barrel member, the set screws may be tightened in place against the exterior surface of the barrel member as shown in FIG. 5 to prevent lateral movement of the flange member with respect thereto. In this case, the semi-circular flange half sections are bolted together as set forth hereinabove. The flange member may be mounted in any intermediate position on the barrel member as desired such as to place it centrally within a masonry wall to be cast or built up therearound.

The pipe barrel and flange members are preferably formed of metal in the above embodiments, although other pipe materials such as plastic, glass, ceramic, etc. may also be used.

Figure 7:
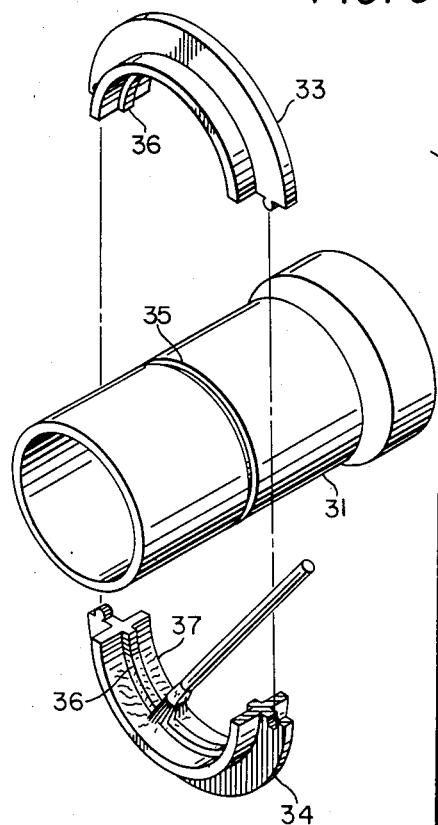
FIG. 7 is an exploded perspective view of the flanged wall pipe of FIG. 6.
Figure 6:
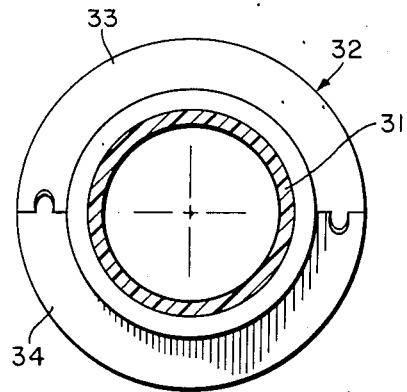
FIG. 6 is a transverse vertical sectional view of a third embodiment of the flanged wall pipe.

In still another embodiment of the present invention as shown in FIGS. 6 and 7 such as where the wall pipe is formed of thermosetting plastic material rather than metal, the barrel member 31 is formed having a right-cylindrical configuration with opposite ends of desired configuration. The flange member 32 is formed of two semi-circular half sections with an outwardly-projecting flange portion. The half-sections designated by the numerals 33 and 34 are also formed of similar plastic material, and preferably formed with tongue and groove shapes on opposite sides such that a single molded shape may be used for both sections. The flange member has an interior diameter closely complemental to the exterior diameter of the barrel member. The barrel member also has an annular groove 35 in its exterior surface as shown in FIG. 7. The flange member is formed with a complemental interiorly-projecting rib member 36 to facilitate interconnection of the groove and rib. An adhesive material designated by the numeral 37 is utilized to join the segments of the flange member to the barrel member to form an integral durable flanged article.

The present invention also includes a method of forming the flanged wall pipe in the field wherever such pipe structure is required. An inventory of flange portions is kept available having an internal diameter complemental to the exterior diameters of the regular pipe sections for surface or non-wall-penetrating purposes. Obviously, an inventory of the latter is kept available. When wall penetration of the pipe is required, such regular pipe section having desired end configurations is taken from inventory. Its generally uniform exterior provides an area for attachment of the flanged portion. Where the flange portion utilizes set screws for attachment, it may be positioned precisely and the set screws tightened into firm engagement with the pipe barrel exterior surface. Where the flange portion possesses an interiorly-projecting annular rib, a complemental annular groove is formed in the pipe barrel exterior surface such as by machining at the desired location of flange attachment. The flange is then permanently attached to the pipe barrel for wall installation utilizing the rib and groove interconnection for rigidity and durability. Also the flange may be welded in place on the pipe barrel, or adhesively attached as in the case of plastic pipe, for example.

Thus, it is readily apparent that the wall joint of this invention having a positionable flange member which is rigidly fixed thereto in desired aligned position provides wall pipes which substantially reduce the normally required inventory. In the case of the barrel and flange members having smooth facing surfaces, they provide a telescopic fit which permits positioning the flange precisely as desired.

The flange provides a large surface area to which the masonry may attach in strongly adherent durable relation. Such attachment prevents both lateral and angular movement of the pipe following installation. The ability of the flange portion to be selectively positioned laterally on the pipe barrel member facilitates such substantial reduction in inventory and provides piping accessories having widespread universal use.

Various modifications may be resorted to within the spirit and scope of the appended claims.

I claim:
1. A wall pipe comprising:
   a cylindrical pipe, having an annular groove formed in the exterior surface;
   a pair of semi-circular segment members, having outwardly extending lugs and inwardly projecting rib members;
   connecting means for connecting the lugs on one segment member to the lugs on the other segment member; and
   a resilient annular gasket between the cylindrical pipe and the segment members, the gasket having openings so that the rib members can directly interconnect with the groove in the cylindrical pipe.
2. A wall pipe as recited in claim 1, wherein the connecting means is a plurality of nuts and bolts.
3. A wall pipe as recited in claim 1, wherein the annular gasket is formed of a thermoplastic material.
4. A wall pipe as recited in claim 1, wherein the cylindrical pipe has a plurality of annual grooves formed in the exterior surface, to provide optional positioning of segment members on the pipe member.
5. A wall pipe comprising:
   a cylindrical pipe, having an annular groove formed in the exterior surface;
   a resilient annular gasket mounted around the cylindrical pipe and having openings;
   a pair of semi-circular segment members, having outwardly extending lugs and inwardly projecting rib members; and
   connecting means for connecting the lugs on one segment member to the lugs on the other segment member, in a position so that the rib members extend through the openings in the gasket to directly interconnect with the groove in the cylindrical pipe.
6. A wall pipe as recited in clim 5, wherein the connecting means is a plurality of nuts and bolts.
7. A wall pipe as recited in claim 5, wherein the annular gasket is formed of a thermoplastic material.
8. A wall pipe as recited in claim 5, wherein the cylindrical pipe has a plurality of annual grooves formed in the exterior surface, to provide optional positioning of segment members on the pipe member.

* * * * *